United States Patent
Ehrman et al.

(10) Patent No.: US 8,176,935 B2
(45) Date of Patent: May 15, 2012

(54) VAPOR RECOVERY CONTROL VALVE

(75) Inventors: Moshe Ehrman, D.N. Halutza (IL); Ilan Akian, D.N. Halutza (IL); Omer Vulkan, D.N. Hanegev (IL)

(73) Assignee: Raval A.C.S. Ltd., Beer-Sheva (IL)

( * ) Notice: Subject to any disclaimer, the term of this patent is extended or adjusted under 35 U.S.C. 154(b) by 359 days.

(21) Appl. No.: 11/792,721

(22) PCT Filed: Dec. 7, 2005

(86) PCT No.: PCT/IL2005/001317
§ 371 (c)(1),
(2), (4) Date: Jun. 11, 2007

(87) PCT Pub. No.: WO2006/064493
PCT Pub. Date: Jun. 22, 2006

(65) Prior Publication Data
US 2008/0072972 A1    Mar. 27, 2008

(30) Foreign Application Priority Data
Dec. 16, 2004   (IL) .......................... 165845

(51) Int. Cl.
*F16K 17/24* (2006.01)
(52) U.S. Cl. ............. 137/493.7; 137/587; 123/518
(58) Field of Classification Search .......... 137/493, 137/493.7, 587, 856; 123/516, 518
See application file for complete search history.

(56) References Cited

U.S. PATENT DOCUMENTS

| | | | | |
|---|---|---|---|---|
| 2,782,777 | A | * | 2/1957 | Jasper ................ 123/73 V |
| 2,821,429 | A | * | 1/1958 | Rantala ................ 296/208 |
| 3,616,783 | A | | 11/1971 | La Masters |
| 5,855,198 | A | | 1/1999 | Nakajima et al. |
| 6,003,499 | A | | 12/1999 | Devall et al. |
| 6,354,280 | B1 | | 3/2002 | Itakura et al. |
| 6,364,145 | B1 | | 4/2002 | Shaw et al. |

(Continued)

FOREIGN PATENT DOCUMENTS

EP    1 488 947 A2    12/2004

(Continued)

OTHER PUBLICATIONS

Israeli Office Action issued in IL Application 128937.

(Continued)

*Primary Examiner* — Stephen M Hepperle
*Assistant Examiner* — William McCalister
(74) *Attorney, Agent, or Firm* — The Nath Law Group; Joshua B. Goldberg

(57) ABSTRACT

A fuel vapor control valve comprising a housing fitted with an inlet port connectable to a fuel tank and an outlet port connectable to a fuel vapor recovery device. The inlet port and the outlet port are in flow communication via a first valve controlled passage admitting fuel vapor flow in a direction from the inlet port to the outlet port only when pressure within the fuel tank exceeds a threshold. A second valve controlled passage admits vapor flow in an opposite direction from the outlet port to the inlet port only when pressure within the fuel tank drops below pressure at the fuel vapor recovery device.

20 Claims, 8 Drawing Sheets

U.S. PATENT DOCUMENTS

| | | |
|---|---|---|
| 6,561,485 B1 | 5/2003 | Moses et al. |
| 6,708,713 B1 | 3/2004 | Gericke |
| 2002/0088494 A1 | 7/2002 | Weldon et al. |
| 2002/0121300 A1 | 9/2002 | Ehrman et al. |
| 2002/0157717 A1 * | 10/2002 | Hong ............................ 137/856 |
| 2003/0136444 A1 | 7/2003 | Ehrman et al. |
| 2004/0194831 A1 | 10/2004 | Balsdon |

FOREIGN PATENT DOCUMENTS

| | | |
|---|---|---|
| IL | 128937 | 9/2002 |
| WO | 02/08597 A1 | 1/2002 |
| WO | WO 0208597 A1 * | 1/2002 |
| WO | 2006/064493 A1 | 6/2006 |

OTHER PUBLICATIONS

The International Search Report for corresponding PCT International Application No. PCT/IL2010/000994; search completed on Jul. 25, 2011; search mailed on Aug. 8, 2011; three pages.

* cited by examiner

VAPOR RECOVERY CONTROL VALVE

FIELD OF THE INVENTION

This invention relates to fluid flow control valves and in particular it is concerned with fuel vapor recovery control valves for mounting in a vehicle between a fuel tank and a fuel vapor recovery device, e.g. a canister, for controlling vapor flow there between.

BACKGROUND OF THE INVENTION

A fuel tank of the type typically mounted in a vehicle, is subject to varying pressure owing to several changing parameters, e.g. fuel consumption during operation of the engine (resulting in pressure decrease within the fuel tank), temperature fluctuations (temperature increase results in pressure increase within the fuel tank whilst temperature decrease results in pressure drop within the fuel tank), refueling (resulting in pressure increase within the tank), etc.

Such pressure changes within the fuel tank may have an overall effect on the engine's performance owing to unsteady fuel supply to the engine and, in some extreme cases, may result in deformation of the fuel tank and even damage thereto, e.g. in the form of cracks which may in turn cause fuel leakage.

In modern vehicles there is typically provided a vapor control system wherein the fuel vapor is transferred from the fuel tank to a recovery device such as a carbon canister, as known per se. For that purpose, it is also known to provide a control pressure valve being in flow communication between the fuel tank and the vapor recovery device for selectively evacuating fuel vapor from the fuel tank on the one hand, and on the other hand, to allow air flow into the fuel tank. However, it is desired not to evacuate unnecessary fuel vapors from the fuel tank so as to prevent fuel droplets from flowing towards the vapor recovery system and in order to reduce fuel consumption.

Some vapor control valves are pressure responsive whereby they open or close responsive to pressure condition at the filling pipe inlet. Other pressure responsive valves respond to vapor pressure within the fuel tank itself. Still another type of fuel vapor control valves respond to the fuel level within the fuel tank.

Fuel vapor developing within the fuel tank is collected and transferred to the vapor recovery device (i.e. a carbon canister) in which air supplied to the engine is enriched by the fuel vapor for enriching the gas mixture injected to the engine on the one hand and, on the other hand, reducing or eliminating fuel vapor escaping to the atmosphere, as this is becoming an ever-growing environmental requirement and which within a few years will become a compulsory requirement by environment control authorities.

However, in order to reduce the evacuation of fuel vapor from the tank (often carrying with it also fuel droplets) and thus reducing overall fuel consumption, it is required that evacuation of fuel vapor to the carbon canister shall take place only upon increase of fuel vapor pressure within the fuel tank over a predetermined pressure threshold.

Among the prior art disclosed in this matter there is WO0208597A1 to Raval, directed to a fuel vapor pressure control valve comprising a housing fitted with a first port connectable to a fuel tank and a second port connectable to a fuel vapor recovery device, a valve assembly for admitting vapor flow in a first direction from said first port to said second port when pressure within the tank rises to a first threshold, or for admitting vapor flow in a second, opposite direction when pressure within the tank drops below the pressure at the fuel vapor recovery device.

U.S. Pat. No. 3,616,783 to Borg-Warner Corp. Discloses a multifunction valve for controlling vapor from a fuel tank, design to open at a first pressure permitting vapor flow towards a vapor collecting apparatus and remains open until the pressure has dropped to a second lower pressure, with a check valve provided to compensate for negative pressure or lowering of fuel level, and a safety relief valve is provided to protect the tank and system from excessive pressure.

U.S. Pat. No. 6,003,499 Stant Manufacturing Inc. discloses an apparatus is provided for controlling venting of vapor to and from a fuel tank. The apparatus includes a housing and first and second valves positioned in the housing. The first valve controls the primary flow of vapors from the fuel tank and includes an aperture permitting an auxiliary flow of vapor to and from the fuel tank. The second valve controls the auxiliary flow of vapor to the fuel tank and includes first and second apertures permitting vapor to flow to the fuel tank. The second valve moves between a first position permitting vapor to flow through the first aperture and a second position permitting vapor to flow through the first and second apertures at a greater flow rate.

It is thus an object of the present invention to provide a fuel vapor control valve for controlling the flow of fuel vapor flow to a fuel recovery apparatus and for venting the fuel tank and fuel recovery apparatus of a vehicle.

SUMMARY OF THE INVENTION

It is an object of the invention to provide a fuel vapor control valve fittable between a vehicle's fuel tank and a fuel vapor recovery device, the control valve having the following features:
  While filling the fuel tank the control valve remains closed so as to facilitate spontaneous shut-off of the fueling nozzle upon pressure within the fuel tank;
  Venting the fuel tank under the regular course of operation, so as to prevent excessive pressure rise within the fuel tank;
  Venting/airing the fuel tank upon pressure drop within the fuel tank (i.e. allowing air back-flow into the fuel tank);
  When pressure within piping extending between the control valve and the fuel vapor recovery device is lower than atmospheric pressure, the control valve prevents fuel vapor flow from the tank, so as to prevent pressure drop within the tank.

According to the present invention there is provided a fuel vapor control valve comprising a housing fitted with an inlet port connectable to a fuel tank and an outlet port connectable to a fuel vapor recovery device, said inlet port and outlet port being in flow communication via a first valve controlled passage admitting fuel vapor flow in a direction from said inlet port to said outlet port only when pressure within the fuel tank exceeds a threshold; and a second valve controlled passage for admitting vapor flow in an opposite direction from said outlet port to said inlet port only when pressure within the fuel tank drops below pressure at the fuel vapor recovery device.

According to the invention, the first valve controlled passage is a diaphragm extending between an inlet chamber associated with the inlet port, and an outlet chamber associated with the outlet port; said diaphragm being normally biased into a closed position sealing said first valve controlled passage at a predetermined force.

The invention is such that the first valve controlled passage remains sealed by the diaphragm as long as the pressure within the fuel tank remains below the pressure threshold; and wherein the second valve controlled passage is a one-way valve admitting flow only in said opposite direction when the pressure within the fuel tank drops below the pressure within the fuel vapor recovery device. By one design, the inlet chamber and the outlet chamber both extend at the same face of the diaphragm, and where an opposite face of the diaphragm resides in a control chamber vented to the atmosphere. Thus, both the first valve controlled passage and the second valve controlled passage remain sealed when pressure at the outlet port is below pressure at the inlet port.

According to one embodiment of the invention the diaphragm is biased to sealingly bear against a perimetric support member defining said first valve controlled passage.

According to the present invention, the one-way valve enables flow only in the opposite direction also at substantially low pressure differentials.

According to one particular embodiment of the invention the outlet chamber is in the form of a tubular wall section, with the second valve controlled passage being one or more apertures extending through said tubular wall and communicating between the outlet chamber and the inlet chamber. According to a first modification the one-way valve is in the form of a resilient sleeve mounted over the one or more apertures formed in the tubular wall section; said resilient sleeve tightly bearing over the one or more aperture so as to normally seal the second valve controlled passage, and whereupon said sleeve deforms into opening the second valve controlled passage upon a predetermined pressure differential between the outlet chamber and the inlet chamber.

According to a second modification the second valve controlled passage is in the form of an aperture extending between outlet chamber and the inlet chamber with a sealing member extending within the inlet chamber and being deformable or displaceable so as to disengage from sealing engagement with said aperture at the event of vacuum within the inlet chamber. The sealing member, according to a particular design, is a leaf-like member pivotally fixed at one end thereof to the housing and being loose at its other end.

According to still another embodiment of the invention the sealing member is received within a protective receptacle or it extends behind a protective shield, to prevent collapsing thereof.

According to still another embodiment, the sealing member is a mushroom-type valve.

BRIEF DESCRIPTION OF THE DRAWINGS

In order to understand the invention and to see how it may be carried out in practice, several embodiments will now be described, by way of non-limiting examples only, with reference to the accompanying drawings, in which:

FIG. 3A illustrates the valve in its fully closed/sealed position;

FIG. 3B illustrates the valve with the first valve controlled passage in its open position; and FIG. 3C illustrates the valve with the second valve controlled passage in its open position;

FIG. 5A illustrates the valve in its fully closed/sealed position;

FIG. 5B illustrates the valve with the first valve controlled passage in its open position; and FIG. 5C illustrates the valve with the second valve controlled passage in its open position;

FIG. 7A illustrates the valve in its fully closed/sealed position;

FIG. 7B illustrates the valve with the first valve controlled passage in its open position;

FIG. 7C illustrates the valve with the second valve controlled passage in its open position

DETAILED DESCRIPTION OF THE INVENTION

Figure 1:
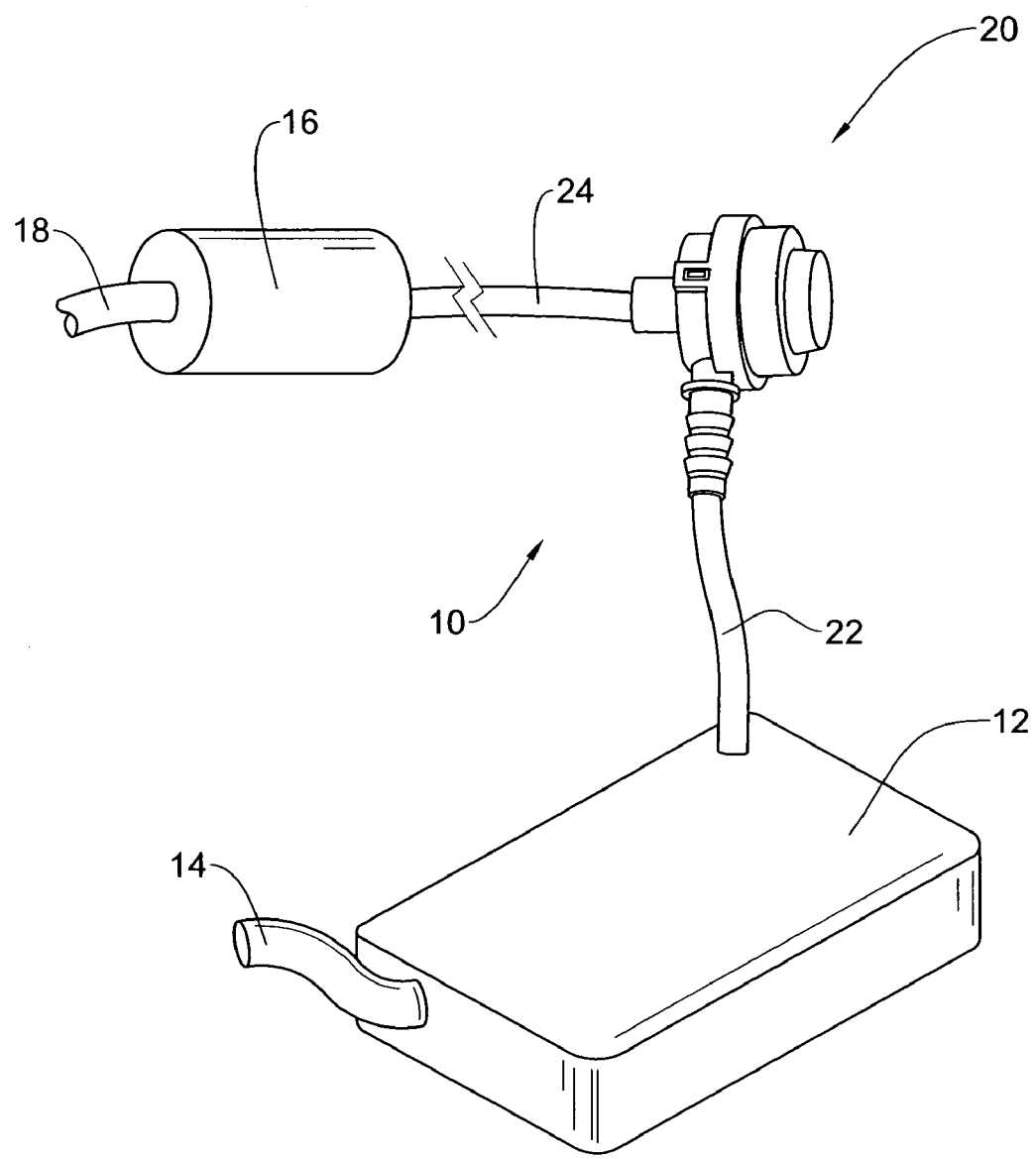
FIG. 1 is a schematic illustration of a vehicle fuel system fitted with a fuel vapor recovery device and a fuel control valve in accordance with the present invention.

FIG. 1 schematically illustrates a vehicle's fuel system generally designated 10 comprising a fuel tank 12 fitted with an inlet pipe 14 and a fuel vapor recovery device 16, typically a carbon canister. In turn, the fuel vapor recovery device 16 may be coupled to the fuel injection system of the engine (not shown) via pipe 18. Fitted intermediate tank 12 and fuel vapor recovery device 16 there is a fuel vapor control valve 20 in accordance with the present invention, connected to the fuel tank via pipe 22 and to the fuel vapor recovery device 16 via pipe 24. Several embodiments will hereinafter be discussed in detail with reference to the remaining figures. It is appreciated however, that the illustration of FIG. 1 is merely schematic and that an actual vehicle's fuel system comprises many more valves and other components, not shown.

A first embodiment of the invention is disclosed with reference to FIGS. 2 and 3A to 3C illustrating a valve designated 20A comprising a housing 26A fitted with an inlet tube section 28A and an outlet tube section 30A defining an inlet port 32A and an outlet port 34A respectively. Extending within the housing 26A there is an inlet chamber 36A and an outlet chamber 38A partitioned by a tubular wall section 42 formed at its upper end with an annular valve seating 44.

A peripheral sealing wedge 52 of the diaphragm 50 is sealingly clamped between a peripheral annular groove 54 of housing 26A and a corresponding clamping portion 58 of cover 62A to thus retain the diaphragm 50 and provide sealing engagement such that a control chamber 66 extending above diaphragm 50 is not in flow communication with either the inlet chamber 36A or the outlet chamber 38A.

In accordance with a modification of the invention, the cover 62A comprises an aperture 68, illustrated in dashed lines, to air the control chamber 66 to the atmosphere.

Figure 2:
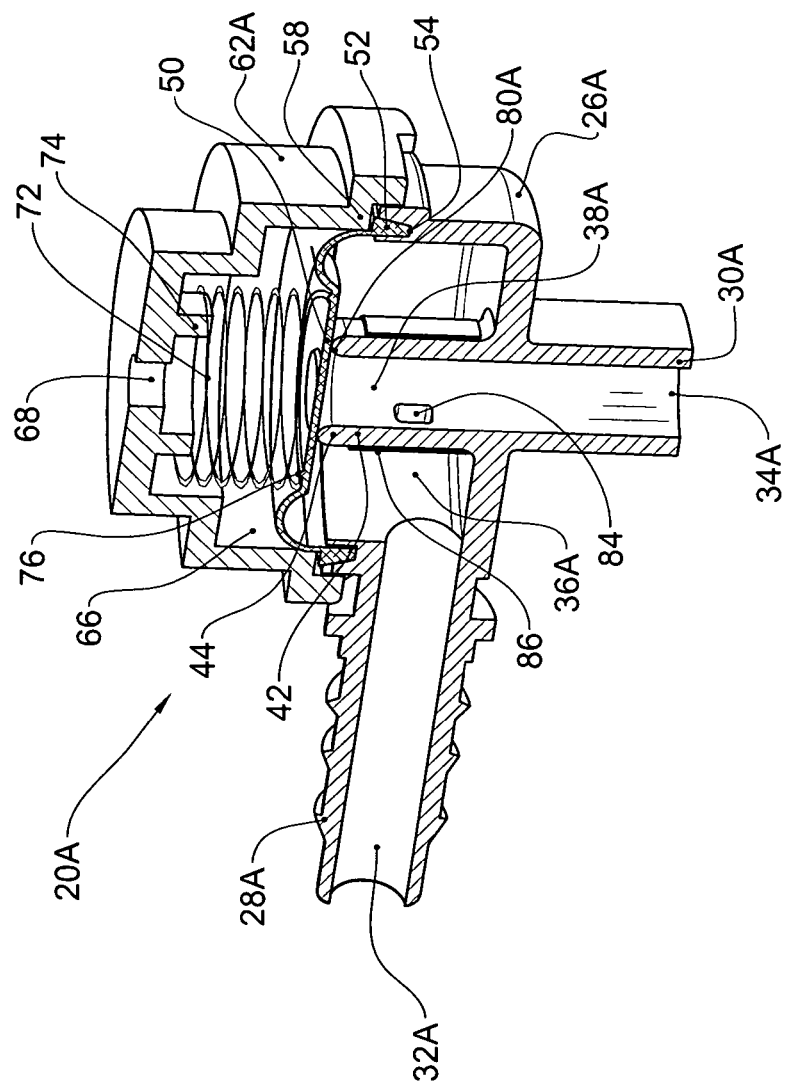
FIG. 2 is sectioned perspective view of a valve according to a first embodiment of the present invention, the valve illustrated in a fully closed/sealed position.

Further noticed in FIG. 2, the diaphragm 50 is normally biased against the sealing ridge 44 by means of a coiled spring 72 bearing at one end against a portion of the cover 62A and at its opposed end against the diaphragm 50, said spring being axially retained by means of a support 74 extending from the cover 62A and a spring retaining projection 76 extending from the diaphragm 50. The cover 62A is typically snap-fitted over the housing 26A, although it may be otherwise attached, e.g. by adhering, heat or sonic welding, etc.

Extending between the inlet chamber 36A and the outlet chamber 38A there is a first valve controlled passage which is normally sealed by diaphragm 50 bearing against ridge 44 of the annular wall portion 42. A second valve controlled passage 84 extends between the inlet chamber 36A and the outlet chamber 38A and is normally sealed by a resilient sleeve member 86 which is self biased into sealing said passage 84.

It is appreciated that the resiliency of the sleeve 86 dominates the minimum pressure required to deform said sleeve so as to open the second valve controlled passage 84. It is further appreciated that fluid flow through the second valve controlled passage 84 is possible only in the direction from the outlet chamber 38A towards the inlet chamber 36A, but not in a reverse direction.

It is further noticed that the section area ratio of the diaphragm 50 exposed to the outlet chamber 38 is substantially smaller than the section area exposed to the inlet chamber 36A (in the form of an annulus) thereby preventing the diaphragm 50 to displace into its open position upon substantially low pressurized fluid flow in the direction from the outlet chamber towards the inlet chamber but, on the other hand, will displace into the open position upon fluid flow in an opposite direction namely, from the inlet chamber 36A towards the outlet chamber 38A, upon a pressure differential which can overcome the nominal threshold of the biasing spring 72 and the elasticity of the diaphragm 50.

Figure 3A:
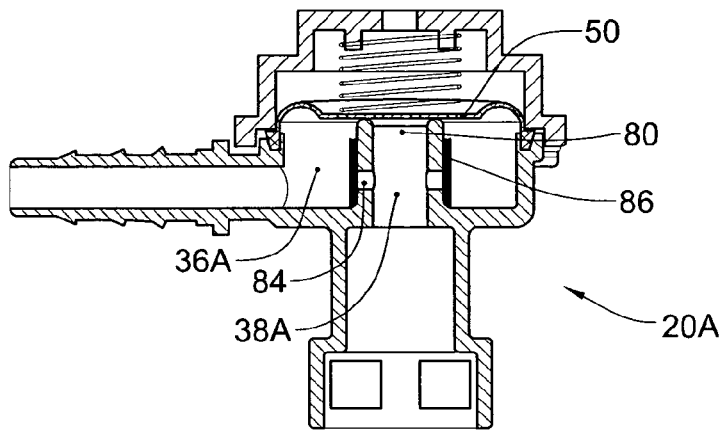
FIGS. 3A to 3C are longitudinal sectional views, illustrating the valve of FIG. 2 in different operative positions, as follows.

FIG. 3A illustrates the valve 20A in a completely sealed position namely where the first valve controlled passage 80 is sealed by diaphragm 50 and where the second controlled passage 84 is sealed by the sleeve 86. In this position there is substantially no flow between the inlet chamber 36A and the outlet chamber 38A namely no fluid flow between the fuel tank and the canister, both of which are not displayed. This position occurs at a substantially pressure equilibrium between the inlet chamber and the outlet chamber and in turn between the fuel tank and the vapor recovery device.

Figure 3B:
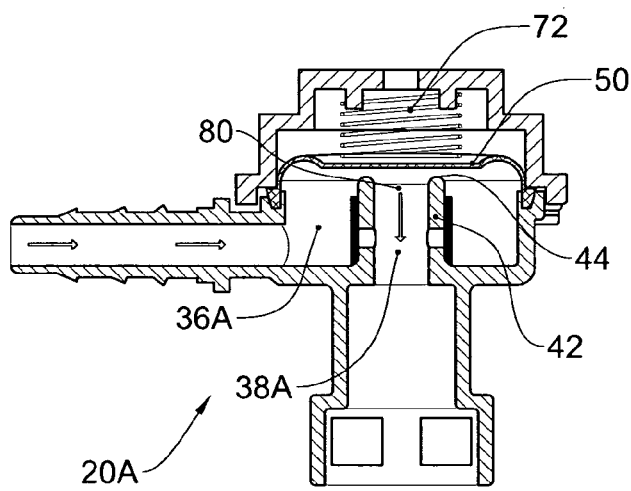

A second position is illustrated in FIG. 3B referring to a position in which pressure rises within the fuel tank the consequence of which a corresponding rise in pressure occurs at the inlet chamber 36A resulting in the formation of the diaphragm 50 so as to disengage the annular rim 44 of the tubular wall 42, thus opening the first valve controlled passage 80 enabling fluid to flow towards the outlet chamber 38A. It is appreciated that the cut-off pressure for displacing the diaphragm 50 into its open position is governed by the elasticity of the diaphragm 50 and by the biasing effect of spring 72.

Figure 3C:
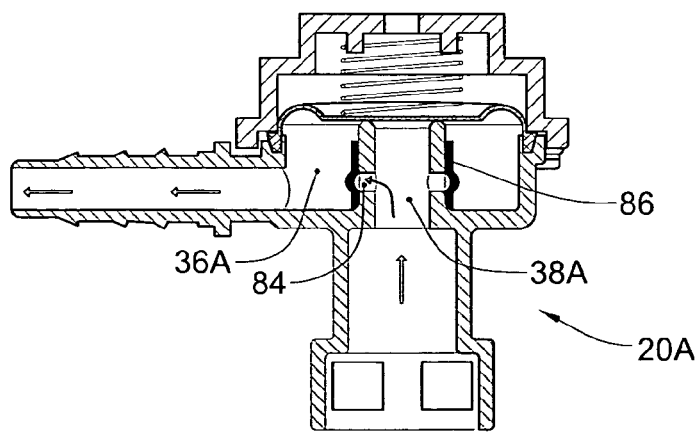

In the position of FIG. 3C, there is illustrated a position where pressure at the vapor recovery device (i.e. canister) is higher than vapor pressure within the fuel tank as a result of which the resilient sleeve 86 is deformed to thereby expose the second valve controlled passage 84 allowing fluid flow in the direction from the outlet chamber 38A towards the inlet chamber 36A and into the fuel tank (not shown).

In the modification where the top cover 62 comprises an airing aperture (68 in FIG. 2) thus the pressure threshold for displacing diaphragm 50 into its open position so as to expose the first valve controlled passage takes into account also the atmospheric pressure residing in the control chamber 66.

Figure 4:
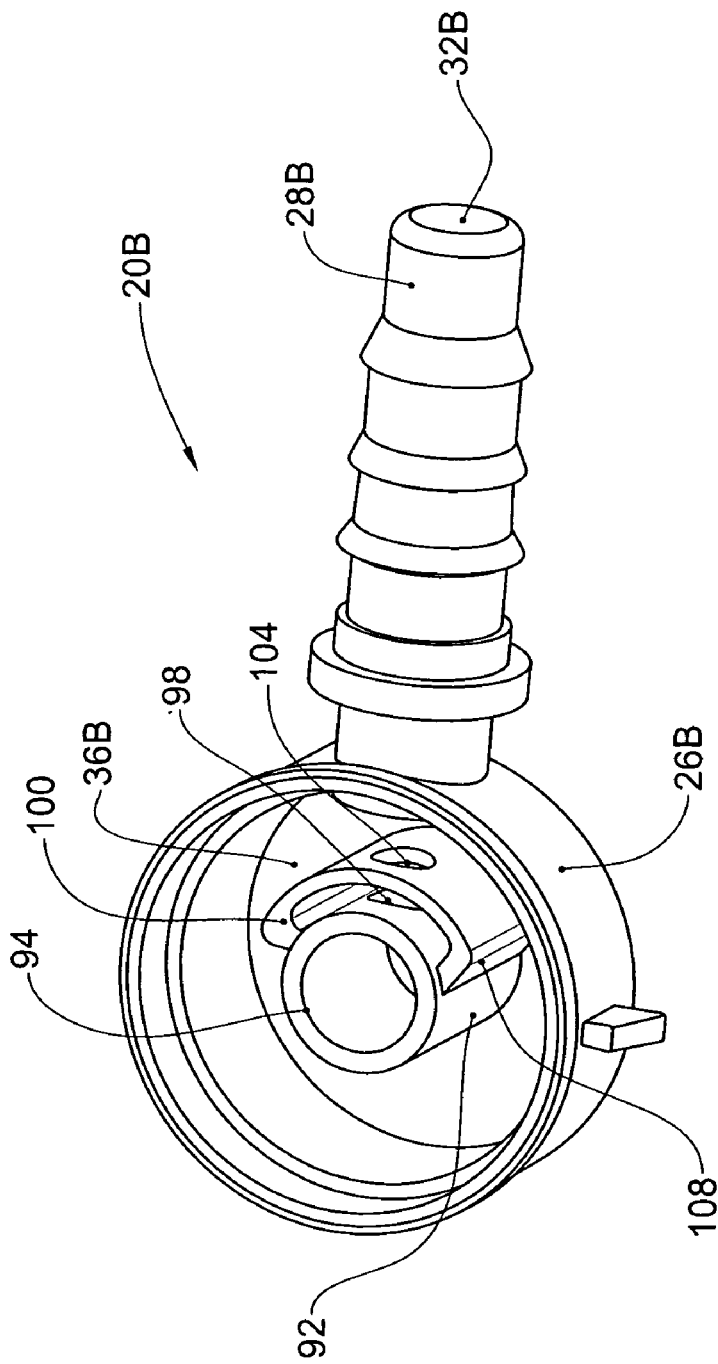
FIG. 4 is a top perspective view of only a bottom portion of a housing of a valve according to an other embodiment of the invention.

Turning now to the embodiment of FIG. 4 there is illustrated a housing portion 26B which is basically similar to housing 26A disclosed in connection with FIG. 2 and comprises an inlet tube 28B defining an inlet port 32B connectable to the fuel tank by suitable tubing (not shown) and extending into an annular inlet chamber 36B. A tubular wall portion 92 is formed with a ridge 94 over which extends the first valve controlled passage, below the diaphragm (see FIGS. 5A-5C) and as already explained in connection with the previous embodiment. A second valve controlled passage in the form of an aperture 98 is formed in the wall 92 similar to the arrangement disclosed in connection with the embodiment of FIGS. 2 and 3 with the provision of a shielding wall 100 also formed with an aperture 104 extending opposite the opening of the inlet tube 28B such that fluid flow there through has practically direct access into a space 108 formed between the shield portion 100 and the corresponding wall portion 92.

Figure 5A:
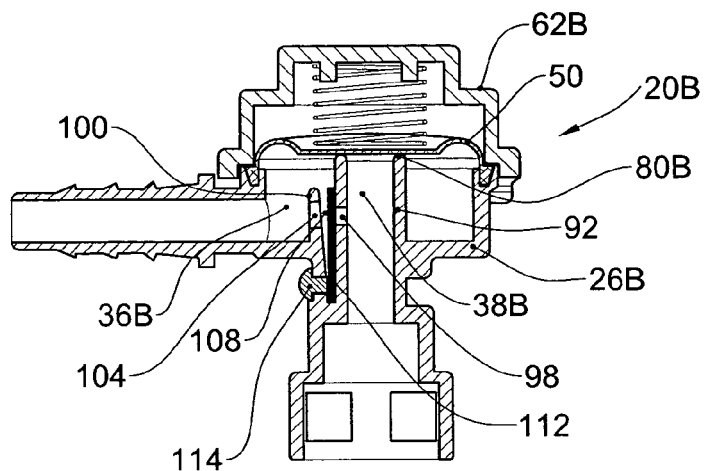
FIGS. 5A to 5C are longitudinal sectional views, illustrating the valve according to the embodiment of FIG. 4, in different operative positions, as follows.
Figure 5B:
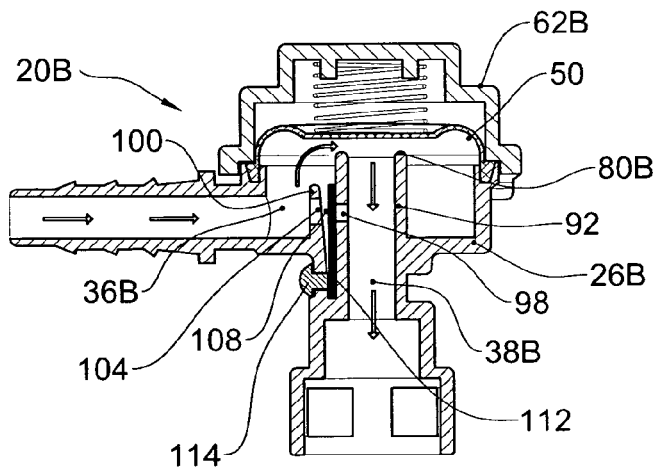
Figure 5C:
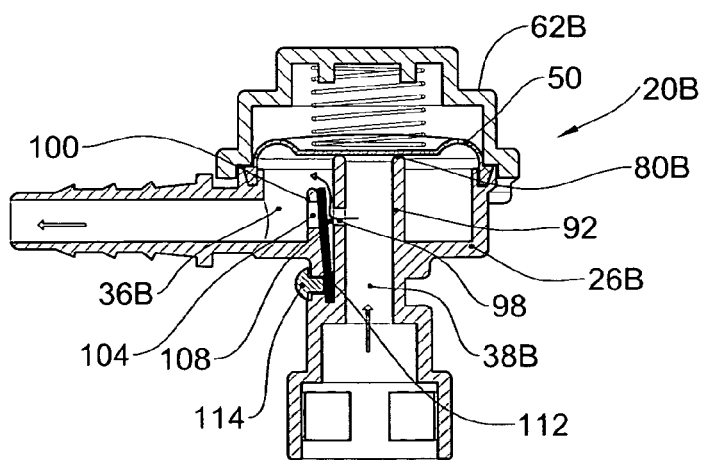
Figure 6:
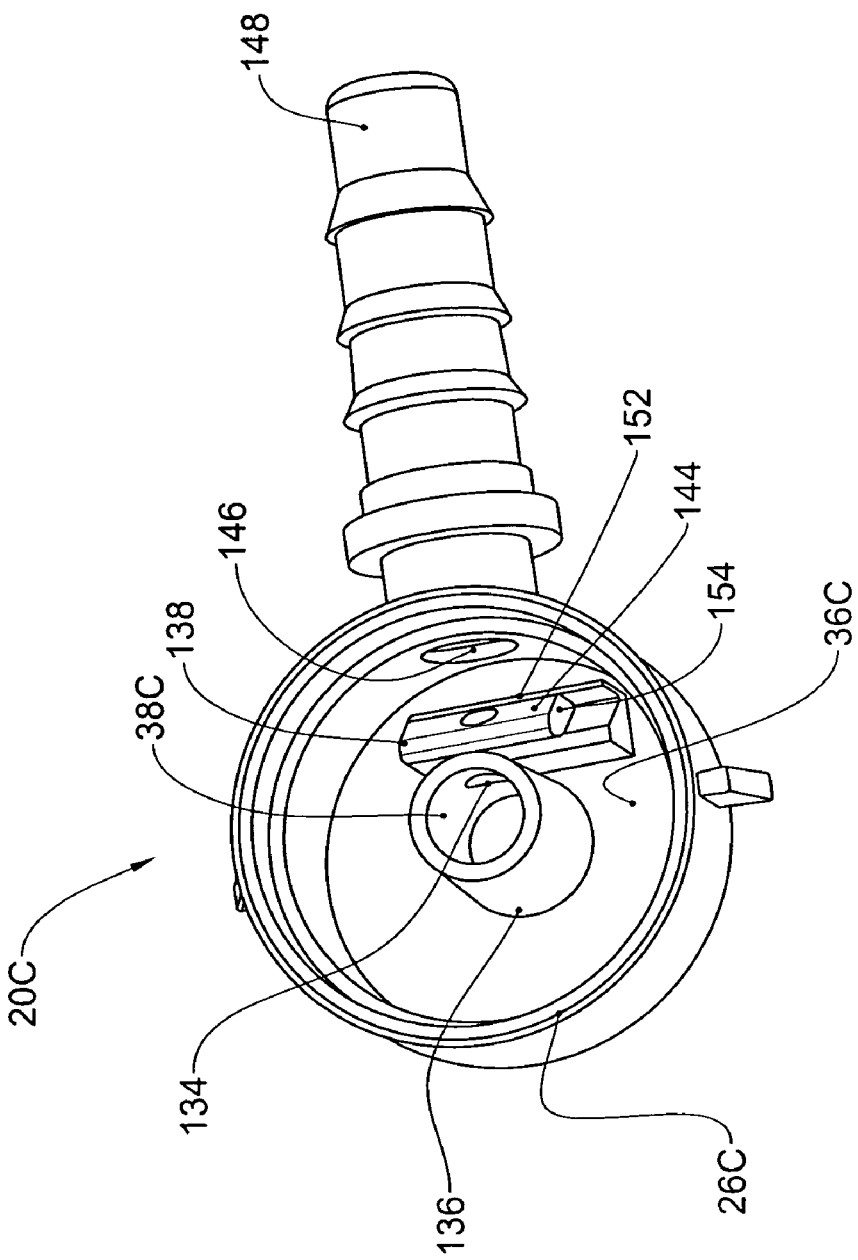
FIG. 6 is a top perspective view of only a bottom portion of a housing of a valve according to a different embodiment of the invention.

With further reference now to FIGS. 4 and 5A to 5C one can notice that there is disposed within the space 108 a sealing member 112 in the form of a resilient leaf fixed at a bottom end thereof to the housing by means of stud 114 such that an upper portion of the seal member 112 is floppy and free to displace between a sealed position (FIGS. 5A and 5B) and an open position (FIG. 5C).

The arrangement in connection with the first valve controlled passage 80B is identical as disclosed in connection with the first embodiment depicted in FIGS. 2 and 3 and the reader is directed to the disclosure hereinabove.

In FIG. 5A the control valve 20B is illustrated in a fully closed position namely with the first valve controlled passage 80B closed by diaphragm 50 and the second valve controlled passage 98 sealed by means of leave-like seal member 108. This position is understood to occur when the pressure at the inlet chamber 36B is lesser than the predetermined pressure threshold required for displacing the diaphragm 50 into its open position and also in a position where the pressure at the fuel tank and as a result at the inlet chamber 36B is higher than the pressure at the outlet chamber 38B.

In the position illustrated in FIG. 5B the first valve controlled passage 80B is opened to allow fluid flow from the fuel tank via the inlet chamber 36B and into the outlet chamber 38B from where it is free to flow to the fuel vapor recovery device. This position occurs upon pressure within the fuel tank namely, when a pressure build-up occurs within the fuel tank preceding the pressure threshold.

In the position of FIG. 5C the first valve controlled passage 80B is illustrated in its closed position whilst the second valve controlled passage 98 is open owing to displacement of the sealing leaf-like member 112 into its open position, i.e. disengaged from the tubular wall portion and bearing against the shield 100, thus allowing vapor flow from the outlet chamber 38B towards the inlet chamber 36B. This position occurs during generation of vacuum within the fuel tank e.g. upon consumption of fuel or in extreme cold locations where the volume of the fuel and fuel vapor within the tank reduce.

It is noticed that the second valve controlled passage 98 remains closed under influence of fluid flow in the direction from the inlet port towards the outlet port owing to slight fluid pressure applied on the leaf-like sealing member 112 through the aperture 104 formed in the shield wall 100.

Figure 7A:
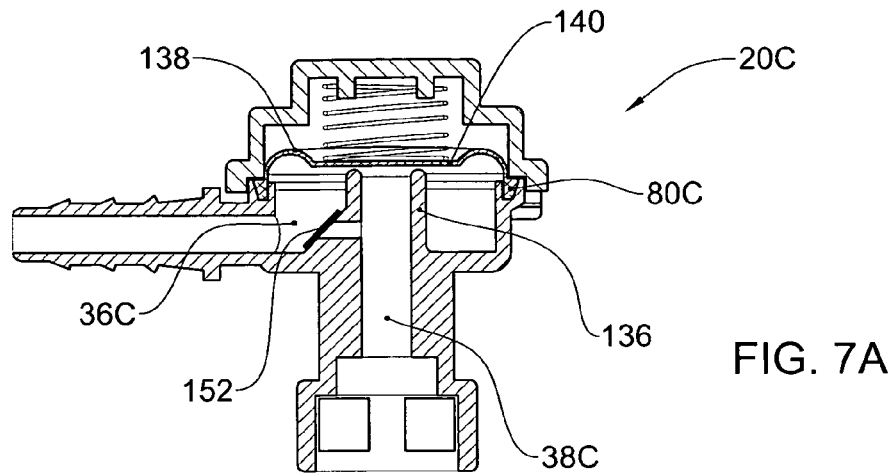
FIGS. 7A to 7C are longitudinal sectional views, illustrating the valve according to the embodiment of FIG. 6, in different operative positions, as follows.
Figure 7B:
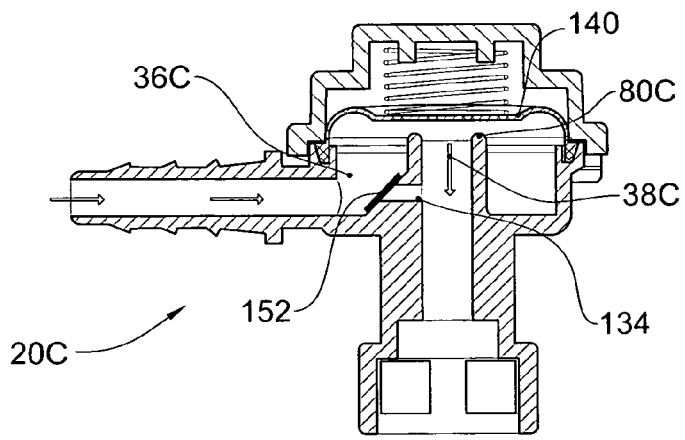
Figure 7C:
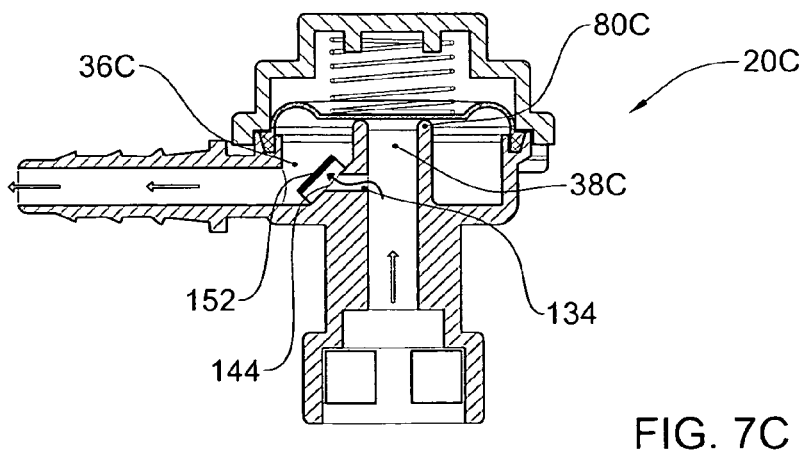

A further embodiment of the invention is illustrated in FIGS. 6 and 7A to 7C, illustrating a control valve in accordance with the present invention generally designated 20C and which up to a great extent resembles the embodiment illustrated in connection with FIGS. 4 and 5A to 5C. The main differences residing between the present embodiment and in the previous embodiment resides in the configuration of the second valve controlled passage 134 formed in the annular wall portion 136 defining the outlet chamber 38C within said annular wall portion and the inlet chamber 36C outside said annular wall portion. The upper ridge 138 of the annular wall portion constitutes the seal for the diaphragm 140 (FIGS. 7A to 7C) constituting therebetween the first valve controlled passage 80C. The second valve controlled passage 134 is in the form of a channel extending between the outlet chamber 38C and the inlet chamber 36C, terminating at the inlet chamber 36C at an inclined bed support 144 facing an outlet 146 of the inlet tube 148. The second valve controlled passage is sealable by means of a leaf-like sealing member 152 secured at one end thereof 154 to the housing 26C. As can be seen in FIGS. 7A and 7B the sealing member 152 is in its sealed position sealingly bearing over the bed 144 sealing the second valve controlled passage 134 whilst in FIG. 7C the sealing member 152 disengages from the bed 144 so as to allow fluid flow in the direction from the outlet chamber 38C towards the inlet chamber 36C.

In FIG. 7A the valve 20C is illustrated in its fully closed position namely with the first valve controlled passage 80C in the sealed position whereby diaphragm 140 sealingly bears over ridge 138 and where the second valve controlled passage is sealed by means of leaf-like sealing member 152 sealingly bearing over the inclined bed 144 and sealing the second valve controlled passage 134. In the position of FIG. 7B the first valve controlled passage 80C is open by means of displacement of diaphragm 140 to disengage from the ridge 138, thereby allowing fluid flow in the direction from the inlet chamber 36C towards the outlet chamber 38C whilst the second valve controlled passage 134 remains in its sealed position.

Figure 8:
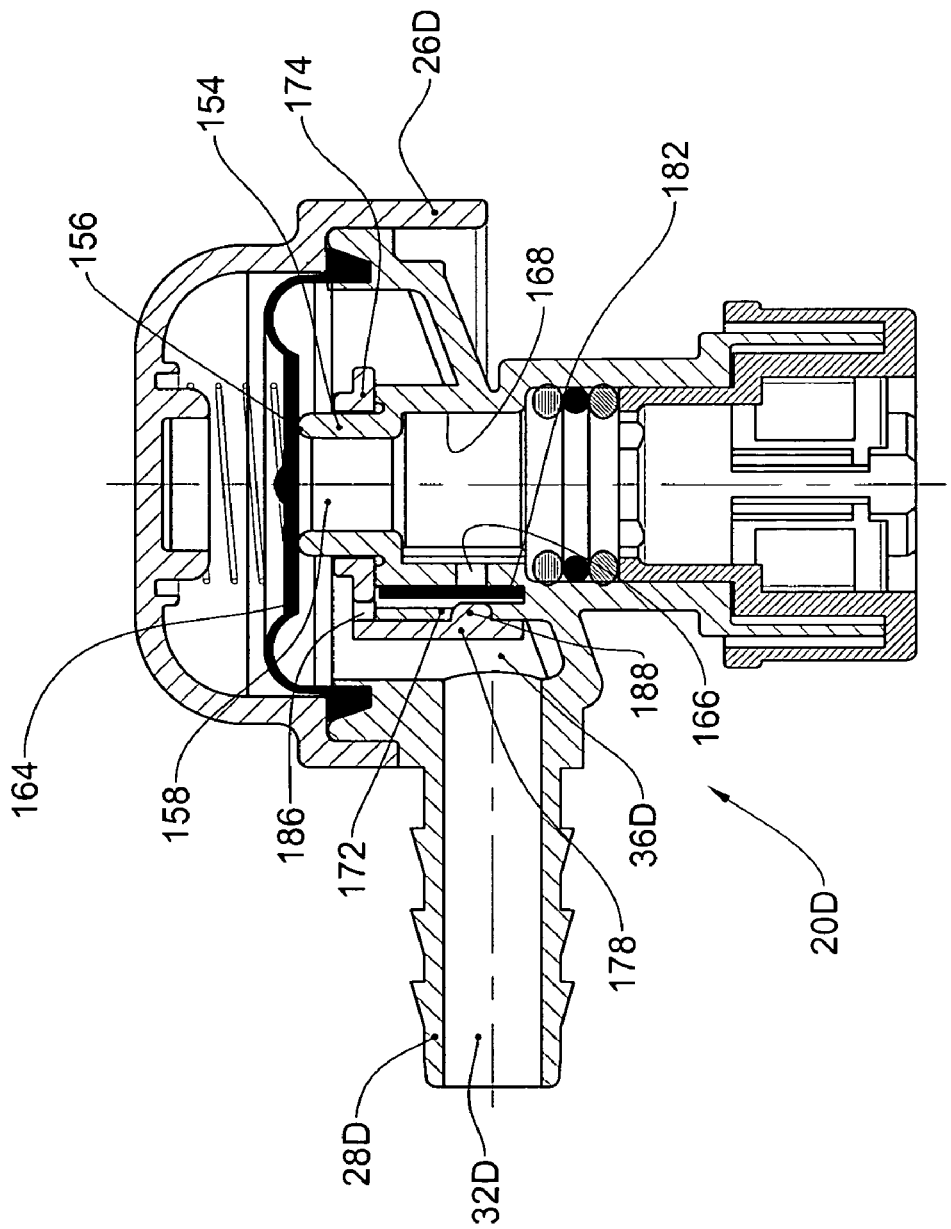
FIG. 8 is longitudinal section through valve according to a modification of the second embodiment of the present invention, the valve illustrated in a fully closed/sealed position.

In FIG. 8 there is illustrated a modification of the second embodiment referred to hereinabove resilient sealing leaf-like member 182. The valve generally designated 20D comprises a housing portion 26D which is basically similar to housing 26A disclosed in connection with FIG. 2 and comprises an inlet tube 28D defining an inlet port 32D connectable to the fuel tank by suitable tubing (not shown) and extending into an annular inlet chamber 36D. A tubular wall portion 154 is formed with a ridge 156 over which extends the first valve controlled passage 158, below the diaphragm 164. A second valve controlled passage in the form of an aperture 166 is formed in wall 168 below the tubular wall portion 154, similar to the arrangement disclosed in connection with the embodiment of FIGS. 2 and 3 with the provision of a shielding member 172 comprising a ring portion 174 for secure mounting over the tubular wall portion 154, and a shielding wall portion 178 extending opposite the aperture 166 and supporting a resilient sealing leaf-like member 182. The ring portion 174 is formed with an aperture 186 to allow fluid flow from aperture 166 towards the inlet chamber 36D. The shielding wall portion 174 is further formed with a protuberant 188 extending substantially opposite aperture 166, so as to support the resilient sealing leaf-like member 182 and prevent it from displacing. Operation of the valve disclosed in FIG. 8 is similar to that disclosed in connection with the previous embodiments, and in particular with respect to the embodiment of FIGS. 4 and 5.

The arrangements disclosed hereinabove with reference to FIGS. 2 to 8 operate such that during filling the fuel tank (refueling) the control valve remains closed so as to facilitate spontaneous shut-off of the fuel pump upon pressure within the fuel tank. However, under the regular course of operation the fuel tank is vented so as to prevent excessive pressure rise within the fuel tank on the one hand and to prevent its bucking under vacuum at the event of substantive pressure decrease. Furthermore, whenever pressure within piping extending between the control valve and the fuel vapor recovery device is lower than atmospheric pressure, the control valve prevents fuel vapor flow from the tank, so as to prevent pressure drop within the tank.

It should be realized that throughout the embodiments of the present invention, the second valve controlled passage may comprise more then one aperture.

Whilst several embodiments have been shown and described in detail, it is to be understood that it is not intended thereby to limit the disclosure of the invention, but rather it is intended to cover all modifications and arrangements falling within the spirit and the scope of the invention, mutatis mutandis.

The invention claimed is:
1. A fuel vapor control valve comprising:
a housing fitted with an inlet port connectable to a fuel tank and an outlet port connectable to a fuel vapor recovery device, the inlet port and the outlet port being in flow communication via a first valve controlled passage defined by a wall portion of an outlet chamber associated with the outlet port, the first valve controlled passage admitting fuel vapor flow in a direction from the inlet port to the outlet port only when pressure within the fuel tank exceeds a threshold; and
a second valve controlled passage for admitting vapor flow in an opposite direction from the outlet port to the inlet port only when pressure within the fuel tank drops below pressure at the fuel vapor recovery device,
wherein the second valve controlled passage is in the form of a first aperture defined in the wall portion of the outlet chamber, the first aperture extending between the outlet chamber and an inlet chamber associated with the inlet port, the second valve controlled passage is provided with a sealing member extending within the inlet chamber and being deformable or displaceable so as to disengage from sealing engagement with the first aperture in the event of vacuum within the inlet chamber,
wherein the sealing member is received between the wall portion of the outlet chamber and a shielding member disposed in the inlet chamber, the shielding member is in the form of a pocket surrounding the sealing member and comprises a ring portion for secure mounting over the wall portion and a shielding portion extending opposite the first aperture, the wall portion of the outlet chamber and the protective shield shielding member retaining the sealing member,
wherein the shielding member is formed with a second aperture to allow fluid flow from the first aperture towards the inlet chamber.

2. A fuel vapor valve according to claim 1, wherein the first valve controlled passage extends between the inlet chamber associated with the inlet port, and the outlet chamber associated with the outlet port, and comprising a diaphragm being normally biased into a closed position sealing said first valve controlled passage at a predetermined force.

3. A fuel vapor control valve according to claim 2, wherein the first valve controlled passage remains sealed by the diaphragm as long as the pressure within the fuel tank remains below the pressure threshold; and wherein the second valve controlled passage is a one-way valve admitting flow only in said opposite direction when the pressure within the fuel tank drops below the pressure within the fuel vapor recovery device.

4. A fuel vapor control valve according to claim 2, wherein the sectional area of the diaphragm at a face thereof associated with the inlet chamber is larger than a face thereof associated with the outlet chamber.

5. A fuel vapor control valve according to claim 2, wherein the diaphragm is biased to sealingly bear against a perimetric support member defining said first valve controlled passage.

6. A fuel vapor control valve according to claim 2, wherein the inlet chamber and the outlet chamber both extend at the same face of the diaphragm.

7. A fuel vapor control valve according to claim 2, wherein a face of the diaphragm opposite the inlet chamber and outlet chamber resides in a control chamber, said chamber being optionally vented to the atmosphere.

8. A fuel vapor control valve according to claim 1, wherein both the first valve controlled passage and the second valve controlled passage remain sealed when pressure at the outlet port is substantially equal to the pressure at the inlet port.

9. A fuel vapor control valve according to claim 3, wherein the one-way valve enables flow only in the opposite direction also at substantially low pressure differentials.

10. A fuel vapor control valve according to claim 5, wherein the support member is cylindrical and where the diaphragm bears against a circular edge thereof.

11. A fuel vapor control valve according to claim 5, wherein the support member is formed with a sealing portion and the diaphragm is formed with a corresponding sealing surface to thereby improve sealing of the first valve controlled passage.

12. A fuel vapor control valve according to claim 2, wherein the diaphragm is biased into its sealing position by a coiled spring bearing at one end thereof against a wall of the housing and at its second end against the diaphragm.

13. A fuel vapor control valve according to claim 2, wherein the wall portion is in a form of a tubular wall section, with the second valve controlled passage being one or more apertures extending through said tubular wall and communicating between the outlet chamber and the inlet chamber.

14. A fuel vapor control valve according to claim 1, wherein the sealing member is a resilient member.

15. A fuel vapor valve according to claim 1, wherein the second aperture is defined between the shielding portion and the ring portion.

16. A fuel vapor valve according to claim 1, wherein the second aperture is defined in a shielding wall portion of the shielding portion.

17. A fuel valve according to claim 1 wherein the second aperture is defined in the ring portion.

18. A fuel vapor valve according to claim 1, wherein the second aperture extends through a wall portion of the shielding member.

19. A fuel valve according to claim 5, wherein the ring portion is mounted about the perimetric support member.

20. A fuel valve according to claim 1, wherein the shielding wall portion is formed with a protuberant extending substantially opposite to the first aperture.

* * * * *